Patented July 26, 1938

2,124,540

UNITED STATES PATENT OFFICE 2,124,540

CELLULOSE ETHER COMPOSITIONS

Edgar C. Britton, Shailer L. Bass, and Earl G. Hallonquist, Midland, Mich., assignors to The Dow Chemical Company, Midland, Mich., a corporation of Michigan No Drawing. Application March 6, 1936, Serial No. 67,420

10 Claims. (Cl. 106—40)

This invention concerns certain new plastic compositions useful in coating solid objects and for the preparation of films, lacquers, etc. The compositions herein dealt with comprise a water-insoluble cellulose ether and a xenyl phosphate. By a "xenyl phosphate" we refer to a neutral aromatic phosphate containing at least one "xenyl", that is diphenyl, radical combined with the phosphate group. The term "xenyl phosphate" includes compounds such as trixenyl phosphate, phenyl-chlorophenyl-xenyl phosphate, etc.

Plasticizing materials are usually incorporated in cellulose ether compositions for the purpose of preventing the latter from becoming hard and brittle on standing. The plasticizing material employed is preferably one which is soluble in the cellulose ether, sufficiently non-volatile so that it is permanently retained in the composition, resistant to discoloration by light, and which is non-toxic toward humans. The last mentioned characteristic, i. e. that of being non-toxic, is particularly important when the plastic composition is to be used in the form of a film or sheet as a wrapping for foodstuffs.

Among the various materials which have been suggested as plasticizers for cellulose ether are triphenyl phosphate and tricresyl phosphates. These phosphates possess certain objectionable characteristics. Triphenyl phosphate is relatively volatile as compared with the phosphates herein dealt with and tends to vaporize from the cellulose ether composition on long standing. Technical tricresyl phosphate, comprising tri-(orthocresyl) phosphate, has been found to be toxic toward humans.

We have found that xenyl phosphates dissolve readily in cellulose ether compositions, are substantially non-volatile and are retained persistently in such compositions. The compositions so formed are tough, highly resistant to discoloration by light, relatively non-inflammable as compared with the cellulose ethers alone, and in the form of films, sheets, or threads are permanently pliable. Certain of the xenyl phosphates, particularly trixenyl phosphate and the phenyl-xenyl phosphates possess the additional advantage of being substantially non-toxic. The invention, then, consists in the new plastic compositions hereinafter fully described and particularly pointed out in the claims.

In general, a composition of the present type is prepared by dissolving a xenyl phosphate such as trixenyl phosphate, phenyl-dixenyl phosphate, etc., in a water-insoluble cellulose ether such as ethyl cellulose, propyl cellulose, n-butyl cellulose, isobutyl cellulose, benzyl cellulose, etc. The xenyl phosphate may be employed in any proportion within the limits of its solubility in the ether, but the final composition is usually toughest and most pliable when it contains between 3 and 50 per cent by weight of the xenyl phosphate.

The operation of dissolving the xenyl phosphate in the cellulose ether may be carried out with or without the aid of relatively volatile solvents such as mixtures of benzene and ethyl alcohol, toluene and ethyl acetate, etc. When molded objects such as buttons, cups, etc., are to be made from the composition, the latter is preferably, though not necessarily, prepared in the absence of such solvents as follows: A solid fibrous cellulose ether is mixed with the desired proportion of a xenyl phosphate and the mixture is passed repeatedly through heated rolls until a homogeneous composition is obtained. Usually, temperatures in the neighborhood of 100°–160° C. produce a workable composition. The latter is then compressed in a mold of the desired shape wherein it is permitted to cool and harden.

When sheets, films, or threads are to be produced, our composition is preferably prepared by dissolving a cellulose ether in a volatile solvent which is also capable of dissolving a xenyl phosphate, e. g. one of the solvents hereinbefore mentioned, and a xenyl phosphate is then added preferably in a proportion representing between 3 and 30 per cent the combined weight of said phosphate and the cellulose ether. The resultant solution, which is preferably quite viscous, may be spread on an even surface and the solvent evaporated to leave a sheet, or may be drawn directly into films or threads under conditions which provide for rapid evaporation of the volatile solvent. The films or threads so obtained, which comprise the cellulose ether and xenyl phosphate, are clear and transparent, resistant to discoloration by light, and are exceptionally tough and pliable.

By way of illustrating the invention, we have prepared a series of films consisting substantially of water-insoluble ethyl cellulose and the compounds di-phenyl-orthoxenyl phosphate, phenyl-di-orthoxenyl phosphate, tri-orthoxenyl phosphate, phenyl-ortho-cresyl-orthoxenyl phosphate, di-(beta-naphthyl)-orthoxenyl phosphate, and di-(para-cyclohexylphenyl)-orthoxenyl phosphate, respectively. Each phosphate was tested in four different concentrations, i. e. films containing 5 per cent, 10 per cent, 15 per cent, and 20 per cent by weight, respectively, of a given xenyl phosphate were prepared and tested. Also, film consisting of water-insoluble benzyl-cellulose and 10 per cent by weight of di-phenyl-ortho-xenyl phosphate was made.

The films were each prepared by dissolving the cellulose ether in a mixed solvent consisting of 3 parts by volume of 95 per cent ethyl alcohol (by volume), 10 parts of dioxane, and 12 parts of benzene. The xenyl phosphate was then added in the proportion necessary to produce a film having the desired composition and the resultant solution was drawn into films in accordance with the usual procedure described in Proc. of A. S. T. M. 22 II 465 (1922). Each of the films so obtained was colorless, odorless, transparent, tough, and pliable and, furthermore, did not become discolored or undergo appreciable change in composition or physical characteristics on long standing under exposure to light. The films containing tri-orthoxenyl phosphate and the phenyl-orthoxenyl phosphates possessed the additional advantage of being substantially non-toxic and accordingly were suitable for use in wrapping foodstuffs. The films containing the xenyl phosphates were from 17 to 60 per cent less permeable to moisture than were films of corresponding thickness prepared by similar procedure, but consisting of the cellulose ether alone.

In place of orthoxenyl phosphates, corresponding metaxenyl- or paraxenyl-phosphates, e. g. tri-metaxenyl phosphate, di-phenyl-metaxenyl phosphate, phenyl-di-metaxenyl phosphate, tri-paraxenyl phosphate, di-phenyl-paraxenyl phosphate, phenyl-diparaxenyl phosphate, chlorophenyl-metaxenyl-paraxenyl phosphate, etc., may be incorporated with a cellulose ether to form excellent plastic compositions which are odorless, colorless, transparent, and tough and which are permanently pliable when in the form of films or threads. Such compositions do not discolor appreciably under exposure to light. Plastics consisting of a cellulose ether and a phenyl-metaxenyl phosphate or a phenyl-paraxenyl phosphate possess the advantage of being substantially non-toxic.

Our plastic compositions may contain ingredients other than those hereinbefore stated. For instance, in place of ethyl cellulose or benzyl cellulose, other water-insoluble cellulose ethers such as propyl cellulose, butyl cellulose, etc., may be treated with a xenyl phosphate to obtain plastics of the present type. In addition to a xenyl phosphate, our plastic compositions may contain other plasticizing agents, e. g. dibutyl phthalate, tri-phenyl phosphate and the like. Also, dyes or pigments may be incorporated with our plastics to produce objects of a desired color or shade. If desired, fillers, e. g. inert substances such as powdered silica, wood flour, etc., may be incorporated in our plastic compositions to increase the bulk thereof.

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A plastic composition comprising a water-insoluble cellulose ether and as a plasticizer therefor a xenyl phosphate in proportions within the limits of its solubility in the ether to increase the moisture resistance of said ether and impart toughness thereto.

2. A plastic composition comprising a water-insoluble cellulose ether and as a plasticizer therefor a xenyl phosphate selected from the class consisting of trixenyl phosphates, phenyl-dixenyl phosphates, and di-phenyl-xenyl phosphates, said xenyl phosphate being employed in proportions within the limits of its solubility in the ether to increase the moisture resistance of the ether and impart toughness thereto.

3. A plastic composition comprising a water-insoluble cellulose ether and as a plasticizer therefor an orthoxenyl phosphate in proportions within the limits of its solubility in the ether to increase the moisture resistance of said ether and impart toughness thereto.

4. A plastic composition comprising a water-insoluble ethyl cellulose and as a plasticizer therefor between 3 and 50 per cent by weight of an orthoxenyl phosphate to increase the moisture resistance of said ether and impart toughness thereto.

5. A transparent, pliable film or sheet comprising a water-insoluble ethyl-cellulose and as a plasticizer therefor between 3 per cent and 30 per cent by weight of an orthoxenyl phosphate to increase the moisture resistance of said ether and impart toughness thereto.

6. A plastic composition comprising a water-insoluble ethyl cellulose and as a plasticizer therefor between 3 and 50 per cent by weight of a neutral xenyl-phenyl phosphate to increase the moisture resistance of said ether and impart toughness thereto.

7. A transparent, pliable film or sheet comprising a water-insoluble ethyl cellulose and as a plasticizer therefor between 3 and 30 per cent by weight of tri-orthoxenyl phosphate to increase the moisture resistance of said ether and impart toughness thereto.

8. A transparent, pliable film or sheet comprising a water-insoluble ethyl cellulose and as a plasticizer therefor between 3 and 30 per cent by weight of phenyl-di-orthoxenyl phosphate to increase the moisture resistance of said ether and impart toughness thereto.

9. A transparent, pliable film or sheet comprising a water-insoluble ethyl cellulose and as a plasticizer therefor between 3 and 30 per cent by weight of di-phenyl-orthoxenyl phosphate to increase the moisture resistance of said ether and impart toughness thereto.

10. The method of making a plastic composition which comprises dissolving a xenyl phosphate in a water-insoluble cellulose ether to increase the moisture resistance of said ether and impart toughness thereto.

EDGAR C. BRITTON.
SHAILER L. BASS.
EARL G. HALLONQUIST.